(12) United States Patent
Jones

(10) Patent No.: US 12,572,470 B1
(45) Date of Patent: Mar. 10, 2026

(54) CACHING IN A SOLVER SYSTEM

(71) Applicant: Amazon Technologies, Inc., Seattle, WA (US)

(72) Inventor: Robert Jones, Beaverton, OR (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/901,793

(22) Filed: Sep. 30, 2024

(51) Int. Cl.
*G06F 12/08* (2016.01)
*G06F 12/0802* (2016.01)

(52) U.S. Cl.
CPC ...... *G06F 12/0802* (2013.01); *G06F 2212/60* (2013.01)

(58) Field of Classification Search
CPC .................................................. G06F 12/0802
See application file for complete search history.

(56) References Cited

U.S. PATENT DOCUMENTS

2006/0230207 A1* 10/2006 Finkler ............... G06F 12/0815
710/240
2024/0265010 A1 8/2024 Garg et al.

FOREIGN PATENT DOCUMENTS

WO 2020/046981 A1 3/2020

OTHER PUBLICATIONS

Amalee Wilson, et al. "Partitioning Strategies for Distributed SMT Solving," https://arxiv.org/abs/2306.05854v1, 2003, 9 pages.
Christoph M. Wintersteiger, et al. "A Concurrent Portfolio Approach to SMT Solving," https://leodemoura.github.io/files/parallel_z3.pdf. Conference paper, 21st International Conference on Computer Aided Verification (CAV 2009), 6 pages.
Matteo Marescotti, et al. "SMTS: Distributed, Visualized Constraint Solving," https://easychair.org/publications/paper/K7BQ. In LPAR-22 (EPiC Series in Computing, vol. 57), 2018, pp. 534-542.
Notification of Transmittal of the International Search Report and the Written Opinion of the International Searching Authority for International Patent Application No. PCT/US2025/046681, mailed on Jan. 26, 2026, 11 pages.

* cited by examiner

*Primary Examiner* — Jae U Yu
(74) *Attorney, Agent, or Firm* — Pierce Atwood LLP

(57) ABSTRACT

A solver system may employ a cache. A cache component may be configured accept inputs and send outputs in the same manner and/or using the same protocols as a solver component. A central manager component may receive a problem from a requestor, and send the problem to one or more solver components and a cache component. If the cache component identifies a stored result, it may return it to the manager component, and the manager component may send the result to the requestor. If the cache component does not identify a stored result (or otherwise does not respond to the manager component), the solver component(s) may operate normally to determine a result and return it to the manager component. In this architecture, however, the cache component is outside of the critical path, and thus the cache search does not increase the latency of the response.

20 Claims, 4 Drawing Sheets

System Component(s) 700

Bus 724

I/O Device Interfaces 702

Controller(s) / Processor(s) 704

Memory 706

Storage 708

Network(s) 199

Requestor 105

Result 151

Problem 101

Manager 110

Solver(s) 120

First Cache 134a

Second Cache 134b

61

65

62b

63

62a

64

CACHING IN A SOLVER SYSTEM

BACKGROUND

A solver is a software engine that can apply logical reasoning to answer a question. For example, a solver may determine whether a given formula or logical expression is satisfiable ("SAT") or unsatisfiable ("UNSAT"). In a Boolean satisfiability problem, a logical expression is said to be SAT if the variables of the logical expression can be replaced by the values TRUE or FALSE in such a way that the logical expression equates to TRUE; if not, the problem is UNSAT. In mathematical logic, a formula is said to be SAT if values (e.g., numbers) can be assigned to the variables and/or interpretations assigned to functions and constants to make the formula TRUE. Multiple solvers may be implemented in a portfolio such that a central manager can send the same problem to multiple solvers. The solvers may attempt to solve the problem and return a result to the central manager, which may send the result to the requesting system or user.

BRIEF DESCRIPTION OF DRAWINGS

For a more complete understanding of the present disclosure, reference is now made to the following description taken in conjunction with the accompanying drawings.

DETAILED DESCRIPTION

Figure 1B:
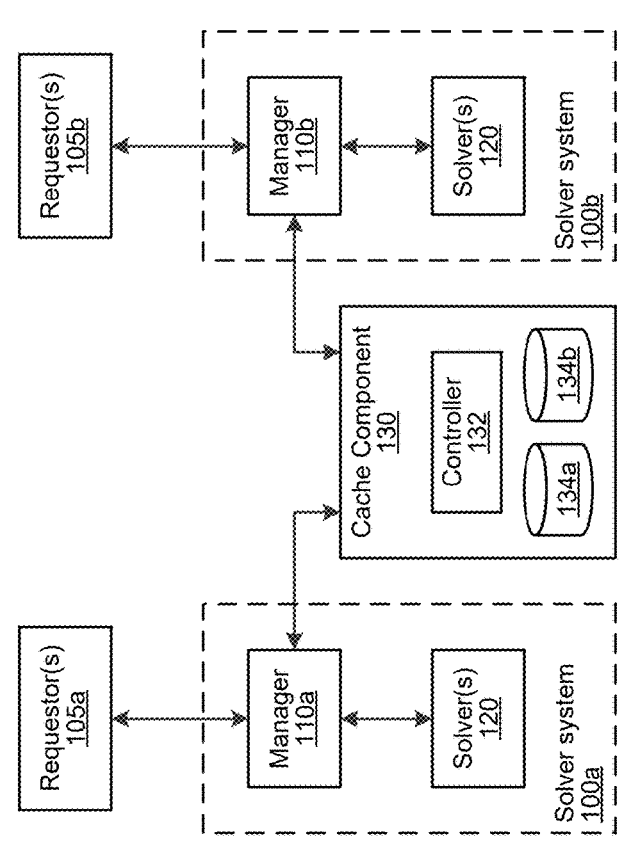
FIG. 1B illustrates a cache component supporting multiple solver systems, according to embodiments of the present disclosure.

A solver is a software engine that can apply logical reasoning to answer a question. A solver may implement one or more algorithms to solve a problem such as a Boolean satisfiability problem. An algorithm may specify a search procedure for exploring a space of possible variable assignments. In some cases, the algorithm may reduce the search space by using a backtracking and/or backjumping procedure for building candidate solutions and abandoning a candidate if the candidate cannot possibly be completed to a valid solution, where backtracking may refer to going up one level in the search tree when the candidate is eliminated, and backjumping may refer to going up two or more levels. Solver types in common usage may include local-search, conflict-driven clause learning (CDCL), and look-ahead. Solvers may be used in, for example, mathematics to assist in proving mathematical theorems, software verification to check whether a program performs to specification, hardware verification to check whether a finite-state system performs to specification, and operations research to solve optimization and scheduling problems. Solvers may be implemented in cloud computing architectures where they can leverage vast computing resources (e.g., processor power and/or memory space) that enable them to solve complex problems.

Some solvers perform better than others on some problems; however, no known solver performs better than all other solvers on all problems. Moreover, it is generally difficult if not impossible to predict which solver will perform better on a particular problem. Thus, solvers may be implemented in a portfolio architecture in which multiple solvers attack the problem in parallel, increasing the odds that the overall system can find a result to an arbitrary problem in a reasonable amount of time. In a portfolio-based solver system, a central manager can receive a problem from a requestor and send the problem to solvers in the portfolio. In some cases, the solvers may apply different strategies to solve the problem. The solver or solvers can attempt to solve the problem and return a result to the central manager, which can send the result to the requesting system or user.

The central manager (referred to herein as simply "manager") may be a component that includes software and/or hardware configured to control operation of the solver(s). For example, the manager may receive a problem from a requesting system, send the problem to the solver(s) in the portfolio, receive the result(s), and send the result(s) back to the requesting system. In a portfolio-based solver system, the manager can operate the solvers in various ways. In an "audit" operation, the manager may allow all solvers to process the problem for a certain amount of time, giving multiple solvers an opportunity to return results, which may be compared to verify that the results are consistent and/or that the solvers are functioning correctly. In a "race" operation, the manager may send the answer to the solvers and halt the other solvers after the first solver returns a result. Other arrangements may also be possible depending on system configurations and/or resource constraints. For example, in certain situations an "audit" operation may be more likely to determine accurate results while a "race" operation may be more likely to return an answer faster and/or conserve computing (e.g., processor usage, memory usage, etc.) resources. Selecting one or the other may depend on present operating constraints.

While portfolio solving may improve the speed and/or reliability of solving problems, it may also introduce overhead in the form of duplicated work. The solvers may redundantly solve the same problems and/or subproblems. Even in a non-portfolio-based solver system (e.g., a solver system with a single solver), the system may solve many similar problems in sequence, which may also lead to duplicated work. A solver system, whether portfolio-based or not, may mitigate some of the increased overhead by caching some problems and/or subproblems and their results. When the system receives a problem, it may search the cache and, if a result is found (e.g., a "hit"), the system may return that result. If the cache does not include the problem/result, however (e.g., a "miss"), the system may send the problem to the solver(s) for evaluation. While caching problems/results in this manner can reduce processor and/or memory usage in some cases, it may increase the average latency of the system as the cache search is performed prior to each assignment of the problem to the solver(s), thus potentially adding delay while the system determines if an incoming problem is new before beginning to work on a solution. Moreover, having a cache in the critical path may introduce another point of failure into the solver system.

Offered herein are techniques for implementing a cache to act as a solver in a portfolio-based solver system. The cache may be configured within the portfolio architecture to receive problems and return results the way a solver would. The manager may thus receive a problem and send the problem to the cache at the same time it sends the problem to the solvers in the portfolio, thereby removing cache search latency from the critical path. If the cache includes the problem/result, it may return the result to the manager. The manager may handle the result the way it would handle a result from a solver. For example, in a race operation, if the manager receives the cached result first, it can return the result to the requestor and halt the solvers. In an audit operation, the manager may receive the cached result and compare it along with results from any other solvers received in the allotted time. If the cache does not include the problem/result, the cache may simply not send a response to the manager.

The solver system may be configured with logic for adding a new problem/result to the cache. To populate the cache, the system may use results from the solvers. For example, if the manager receives an acceptable result from a solver, the system may store data representing the problem/result in the cache for use if the system is presented with the same or similar problem again. In some cases, the system may cache the problem/result immediately. In some cases, the system may cache the problem/result offline; that is, some amount of time later when the system is idle or operating below capacity. The system may store problems/results selectively, however. For example, if a problem is relatively easy to solve (e.g., requiring little time and/or compute to determine a result), caching the problem/result may yield little benefit. Similarly, if a problem/result is relatively large, it may be cheaper to process the problem repeatedly than to cache it.

In some implementations, the cache may be implemented in a tiered architecture. For example, a first cache can be relatively small (e.g., in terms of storage capacity) and fast (e.g., in terms of latency). The first cache can simply store data indicating whether or not the system has a result stored for a given problem. A second cache may store the actual result. The second cache may be larger and/or slower than the first cache. But the manager can, by determining quickly using the first cache that the system has a result stored for a particular problem, halt the solvers and conserve computing resources prior to, and without waiting for, the result to be retrieved from the second cache.

In some implementations, the same or different cache may store additional information related to the problem/result. For example, the cache may store a model of the result. A model is an assignment of values to variables and, in some cases, interpretations of functions and/or constants that make a given formula or logical expression TRUE. For example, in a Boolean logical expression, the model may be an assignment of TRUE or FALSE to each variable that results in the logical expression being TRUE. In a mathematical formula, the model may be an assignment of a numerical value to each variable and/or an interpretation assigned to each function and/or constant that results in the equation being true. A model is one possible way of showing that a problem is satisfiable ("SAT"). In some cases, the problems to be solved by the system may be nondeterministic polynomial-time complete, or "NP-complete." NP-complete refers to the complexity of the problem in a computational sense. NP-complete problems are the hardest problems to solve in the NP class of problems; however, a solution to an NP problem may be verified quickly (e.g., in polynomial time) using the model. Thus, the model may be used by the system and/or the requestor to verify the result. In some cases, the system may use the model to verify the solution and record that it has done so, while discarding the model itself. In cases where the problem is found to be unsatisfiable ("UNSAT"), no model exists to verify the result. In the case of a result of UNSAT, the system may, in some implementations, produce a proof of the result (e.g., that the problem is UNSAT). Thus, the system may store a model for a problem found to be SAT, and/or a proof for a problem found to be UNSAT.

In various implementations, the system may cache and/or otherwise store different kinds of information about the problem, result, the system's handling of the problem, etc. The system may cache the information in any format; for example and without limitations, numbers, strings, JavaScript Object Notation (JSON) documents, etc. The information may include telemetry data regarding operation of a solver component and/or cache component. The telemetry data may include information regarding which solver first returned a result, how long it took for the solver to determine the result, memory and/or compute usage of the solver, the solver version and/or configuration, etc. The system may compile telemetry data and include whether another solver or solvers determined a result, timed out, were halted by the manager, etc.

In some implementations, the system may employ various techniques to check cached results. For example, the manager may occasionally allow one or more solvers to continue processing a problem even after the cache returns a result. The manager may compare the cached result to the solver result. The manager may perform these checks over certain intervals. For example, the manager may check the cached result in this manner for every thousandth, hundredth, tenth, etc., problem. This technique may be similar to the audit operation described above. In some cases, the manager may return the cached result while the solver(s) continues to process the problem. In some cases, the manager may wait for a time period for response to lapse, and compare the cached result to any results returned by the solvers during the allotted time period. In such cases, the manager may shorten the period for response if a solver is able to provide a model and/or proof of the result. If a solver is able to provide a proof of the result, the system may determine there is no need to separately verify the result. Thus, the audit period may be shortened without sacrificing accuracy.

These features may be implemented alone and/or in combination with each other and/or other features described herein. The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Figure 1A:
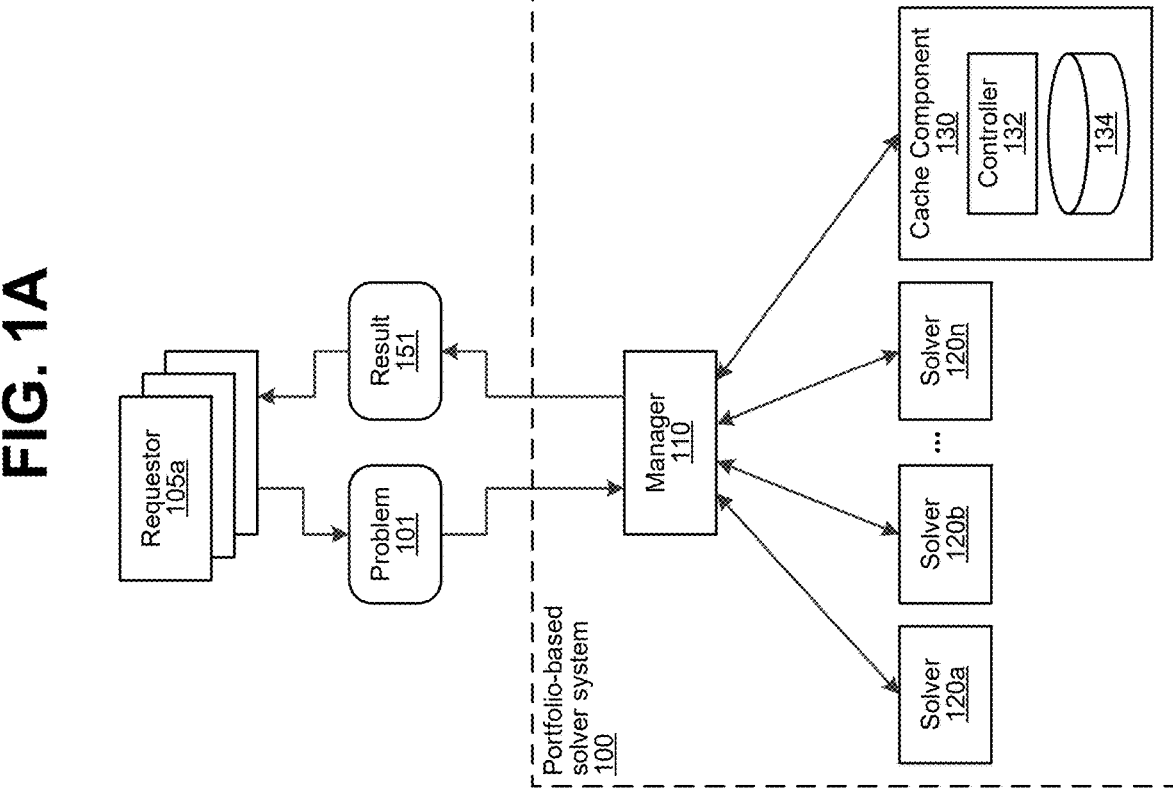
FIG. 1A is a conceptual diagram of a portfolio-based solver system configured with caching, according to embodiments of the present disclosure.

FIG. 1A is a conceptual diagram of a portfolio-based solver system 100 configured with caching, according to embodiments of the present disclosure. The system 100, and the components therein, may execute on one or more system components 700 described in further detail with reference to FIG. 7. The system 100 may include hardware and/or software configured to receive a problem 101 from a requestor 105 and return a result 151. The problem 101 may be, for example, a satisfiability problem such as a Boolean or mathematical logical expression and/or formula. As used herein, a "satisfiability problem" may include a Boolean or mathematical logic problem. Such formulas may be expressed using formalisms such as, for example, DIMACS, SMT-LIB, or the like; however, the system 100 is not limited to any particular formalism or expression. In some cases, the requestor 105 may send the problem 101 and request a result 151 indicating that the problem 101 is satisfiable ("SAT") or UNSAT. In some cases, the requestor 105 may send a problem 101 with a request to confirm that the problem is SAT or UNSAT; for example, the request may be in a form: "We expect the result of the problem 101 is SAT," or "We expect the result is UNSAT." The result 151 may indicate the system's determination that the problem 101 is SAT or UNSAT, or that the system could not determine a SAT or UNSAT result in a given time (e.g., a TIMEOUT). In some cases, the result 151 may include additional information, such as a model or proof that verifies the result 151, or simply an indication that a model or proof has been determined.

The requestor 105 may be a system component (e.g., a system component 700 separate from that/those of the system 100) and/or a user device or client device. The requestor 105 may include hardware and/or software to formulate problems 101 for processing by the system 100. In one example use case, the requestor 105 may be responsible for managing the security of an enterprise network exposed to the wider Internet (e.g., via the computer network 199 as described below with reference to FIG. 7). In this type of problem, some internet protocol (IP) addresses may correspond to a network hub and/or data center to which an administrator may wish to limit access to certain other IP addresses. In this example, the administrator may act as a requestor 105, and the problem 101 may include a symbolic representation of internet traffic. The result 151 may indicate whether, under current network conditions, traffic from an unauthorized IP address can reach secured IP addresses and/or how to modify the enterprise network to reduce or eliminate a vulnerability. The internet traffic to be processed may be on the order of a million, billion, or even a trillion calls per day; however, because the network is generally static and changes slowly, many of the problems to be considered for this network traffic (e.g., problem 101) will be the same. Thus, caching results 151 may result in a factor of up to five to ten or more increase in efficiency (e.g., in terms of computing resources used by the system 100). In another example use case, the requester 105 may be responsible for reasoning about source code. In this type of application, properties about the code may be proved or disproved. For example, a common property is to see if the code ensures memory safety. Another common application is to ensure that the code corresponds to a specification. For example, the requestor 105 could use the system 100 to ensure that cryptographic code correctly implements a standard cryptographic algorithm, such as SHA-2. In yet another example use case, the requester 105 may be responsible for determining if the output of a large language model (LLM) is a hallucination. In this application, the LLM output may be translated to a logic representation and compared against domain-specific knowledge also encoded in logic. In some implementations, the system 100 may serve multiple requestors 105*a*, 105*b*, 105*c*, etc. (collectively "requestors 105"). A requestor 105 may be associated with a particular profile or account that corresponds to a particular solver system 100 and/or cache component 130. In some implementations, a system 100 and/or a cache component 130 may serve more than one requestor, as described further below with reference to FIG. 1B.

The system 100 may include one or more solver components, referred to herein as a solver 120. A solver 120 may include hardware and/or software configured to process a problem 101 and, if possible, determine and return a result 151. In some implementations, a solver 120 may return additional information such as telemetry data corresponding to a result 151. The telemetry data may include an identify of the solver 120, the configuration of the solver 120, the time/memory/compute used to determine the result 151, a size of the problem 101 and/or result 151, etc. In some implementations, the system 100 may be configured with multiple solvers 120*a*, 120*b*, . . . 120*n* (collectively, "solvers 120"). The system 100 may have various configurations including having a single solver 120, multiple different solvers 120 (e.g., local-search, conflict-driven, and/or look-ahead), multiple versions of the same solver 120 but having different configurations/settings and/or applying different strategies, multiple versions of the same solver 120 initiated with different seeds (e.g., a random number used to initiate search and/or evolutionary solver methods), etc.

The system 100 may include a central manager component, referred to herein as a manager 110. The manager 110 may include hardware and/or software configured to receive problems 101, send them to the solver(s) 120*a*, 120*b*, etc. (collectively "solvers 120") and a cache component 130, receive results 151, and return the results 151 to the requestor(s) 105. In some implementations, the manager 110 may be configured for additional functionality, such as comparing results 151 (e.g., from the cache component 130 and/or one or more solvers 120), verifying a result 151 (e.g., using a model and/or proof), adding a new problem/result to the cache component 130, verifying results 151 stored by the cache component 130, managing cached contents (e.g., removing old or infrequently requested results 151), etc. When the system 100 receives a problem 101, the manager 110 may send the problem 101 to all of the solvers 120. If the manager 110 receives a result 151 from a solver 120 before receiving a stored result 151 from the cache component 130, the manager may, in some cases, enqueue a cache write to store the result 151 in the cache component 130 for use in handling the same or similar problem(s) 101 in the future. The manager 110 may enqueue the cache write operation to be performed immediately or at a later time—in either case, however, the cache write may be outside of the critical path for responding to the problem 101, and thus does not add latency to the system's response.

The manager 110 may operate in various configurations related to the timing of sending problems 101 and receiving results 151. In some implementations, the manager 110 may send the problem 101 to the cache component 130 and the solver(s) 120 in parallel (e.g., at substantially the same time). In some cases, however, the system 100 may operate more efficiently if a problem 101 is sent to the cache component 130 or the solver(s) 120 first. For example, if querying the cache component 130 is relatively costly (e.g., in terms of computing resources and/or the cost thereof), the manager 110 may send the problem 101 to the solver(s) 120 first, and allow the solver(s) 120 some duration of time (e.g., a few milliseconds to a few seconds) to process the problem

101 before the manager 110 sends the problem 101 to the cache component 130. If the problem 101 is relatively easy/quick for the solver(s) 120 to solve, a solver 120 may return a response before the manager 110 queries the cache component 130, which may save the cost associated with the query. A further reason for adding such a delay in sending the problem 101 to the cache component 130 is that the system 100 may not to cache results 151 for problems 101 that are relatively easy/fast to solve (as discussed further below with reference to FIG. 3); thus, the cache component 130 may not have a result stored for such an easily solvable problem 101 in any case.

If, however, queries to the cache component 130 are relatively inexpensive (e.g., in terms of computing resources and/or the cost thereof), the manager 110 may send the problem 101 to the cache component 130 first and wait a short duration of time (e.g., a few milliseconds to a few tens of milliseconds) to see if there is a cache hit before sending the problem 101 to the solver(s) 120. In the case of a tiered cache (e.g., as described below with reference to FIGS. 5 and 6), the cache component 130 may determine very quickly whether the cache component 130 has a stored result 151; thus, this duration may be kept very short, and the manager 110 can keep the delay before sending the problem to the solver(s) 120 very brief. If there is no cache hit (e.g., a "miss"), the manager 110 may send the problem 101 to the solver(s) 120 with minimal added latency. Moreover, if the cache component 130 experiences an error and/or failure, the cache component 130 is out of the critical path between the requestor 105 and the solver(s) 120, and the system 100 will may still respond to the problem 101 without undue delay. In some implementations, the manager 110 may include logic to determine, based on a given problem 101, whether to send it to the cache component 130 or the solver(s) 120 first, or both at the same time.

With respect to the timing for receiving requests, the manager 110 may operate in a race configuration (e.g., forwarding the first received result 151 to the requestor 105) and/or an audit configuration (e.g., allowing additional time for the solver(s) 120 to return a result 151). In a race configuration, the system 100 may wait for the first result 151 returned by a solver 120 or the cache component 130, send that result 151 to the requestor 105, and instruct the other solver(s) 120 to halt further processing (thereby conserving computing resources). If the cache component 130 does not identify a stored result 151 corresponding to the problem 101, it may respond to the manager 110 accordingly or simply send no response. In some implementations, if a solver 120 returns a result 151, the manager 110 may send the result 151 to the cache component 130 for use in handling future problems 101. In some cases, the manager 110 may first verify the result 151 and/or determine whether the problem 101 and/or result 151 meet certain compute and/or size conditions that make them appropriate for caching. In some implementations, the manager 110 may send additional information for storage by the cache component 130; for example, telemetry data such as the solver 120 that determined a result 151, the configuration of the solver 120, the time/memory/compute used to determine the result 151, a size of the problem 101 and/or result 151, etc. The system 100 may include various settings and/or policies that control which/when a result 151 is cached. In some implementations, the requestor 105 can specify such policies based on, for example, a cost of using the solver(s) 120 versus storing results 151 using the cache component 130. Example operations for updating the cache component 130 are described below with reference to FIG. 3.

In an audit configuration, the manager 110 may determine an allotted time for solving the problem 101, send the problem 101 to the solver(s) 120 and cache component 130, and collect results 151 until the allotted time has elapsed to return a result 151, if any, to the requestor 105. In some cases, the manager 110 may receive a single result 151. In some cases, the manager 110 may receive multiple results 151. The manager 110 may, in such cases, compare the results to each other. If the manager 110 determines that two or more results 151 differ, it may flag the issue for further investigation.

In some implementations, one or more solvers 120 may be configured to return a model and/or poof that may be used to verify the result 151. If one of the results 151 is accompanied by a model and/or proof, the manager 110 may verify the result 151 and return the verified result 151 to the requestor 105. If a cached result differs from the verified result 151, the manager 110 may update the cached result by sending the verified result 151 to the cache component 130. In some cases, the discrepancy may be logged and/or a notification issued to prompt further investigation. If the system 100 is operating in an audit configuration and the manager receives a model/proof that verifies a result 151, there is no need to await other results 151 to verify the first, and the manager 110 may instruct the other solver(s) 120 to halt further processing.

In some implementations, the system 100 may periodically or occasionally check cached results 151. For example, the manager 110 may allow the solver(s) 120 to continue processing a problem 101 after the cache component 130 has returned a response. The manager 110 may then compare the solver 120 result 151 to the stored result 151 returned by the cache component 130. If the results 151 differ, the system 100 may flag the issue for further investigation. If the solver 120 includes a model and/or proof of the result 151 such that the manager 110 can verify the result 151, the manager 110 may send the verified result 151 to the cache component 130 to replace the previous stored result 151. The manager 110 may check the cached result in this manner for every thousandth, hundredth, tenth, etc., cached result 151. Example operations for verifying cached results 151 are described below with reference to FIG. 4.

The cache component 130 may include hardware and/or software configured to receive a problem 101 from the manager 110 and, if possible, return a result 151 to the manager 110 in the same manner (e.g., using the same or similar protocol) as a solver 120. For example, the cache component 130 may expose an application programming interface (API) to the manager 110 that matches an API exposed by a solver 120. This may allow the manager 110 to send a problem 101 to the cache component 130 and the solver(s) 120 of the system 100 at the same time and/or using the same format, and to receive a result 151 from the cache component 130 and/or the solver(s) 120 in the same format. This allows the cache component 130 to act transparently; that is, without the system 100 having to implement separate logic and/or protocols to check for cached results 151. Moreover, this architecture removes the cache component 130 and the process of checking for cached results from the critical path. Rather than check the cache for a stored result 151 prior to sending a problem 101 to the solver(s) 120, the system 100 may send the problem 101 to the solver(s) 120 and cache component 130 simultaneously, thus avoiding the added latency of checking the cache before sending the problem 101 to the solver(s) 120. This may also eliminate the cache component 130 as a point of failure—if the cache component 130 fails to return a response to the manager 110 for any reason, the manager 110 may still receive a result 151 from the solver(s) 120 as it would in normal operation without caching and/or if no cached result 151 exists rather than waiting for a response from the cache prior to sending the problem to the solvers 120. In some implementations, a cache component 130 may support a single solver system 100, as shown in FIG. 1A. In some implementations, a cache component 130 may support several solver systems 100a, 100b, etc. (collectively "solver systems 100"), as described below with reference to FIG. 1B.

The cache component 130 may include a controller 132. The controller 132 may include hardware and/or software configured to exchange data (e.g., problems 101 and results 151) with the manager 110, search the cache 134 for a result 151 corresponding to a given problem 101, and store new results 151 in the cache 134. The cache 134 may include transitory and/or non-transitory memory or storage configured for low-latency search and retrieval of data. In some implementations, the cache 134 may be implemented as a key-value store. Queries to a key-value store may be processed quickly and efficiently because the data (e.g., the "value") can be located directly using the key; e.g., without searching a database. The key may be the problem 101 itself and/or a representation of the problem 101. For example, the controller 132 may process the problem 101 using an encoder, hash function (e.g., a function that can map input data of arbitrary size to a fixed- or variable-length output value), or other mathematical function to determine a vector or string representation of the problem 101. The vector or string becomes the key for searching the cache. If the cache component 130 finds a matching key in the cache, the cache component 130 may retrieve the value corresponding to the matched key. The value may represent a stored result 151 corresponding to the problem. The cache component 130 may return the value (e.g., the stored result 151) to the manager 110.

In addition to storing results 151, the cache 134 may store various types of data in various formats. In various implementations, the cache 134 may store, for example and without limitation, a model and/or proof corresponding to a result 151, an indication that the system 100 determined a model and/or proof and used it to verify a result 151, telemetry data corresponding to a result 151 (e.g., data identifying the solver 120 that determined a result 151, the configuration of the solver 120, the time/memory/compute used to determine the result 151, a size of the problem 101 and/or result 151, etc.), and the like.

The controller 132 may be additionally configured to perform other operations to manage the cache 134. For example, the controller 132 may handle an eviction policy that specifies when a cache entry should be deleted to free space for new data. For example, an eviction policy may specify that a cache entry should be deleted if not used for a certain amount of time and/or if a frequency of use over a certain amount of time is below a threshold. The controller 132 may be configured to overwrite a cache entry when, for example, a stored result 151 is to be replaced with a new result 151. The controller 132 may control the timing of writing entries to the cache. For example, the controller 132 may prioritize search and/or read operations, while queuing write operations to perform offline, between search/read operations, and/or when the cache component 130 is operating a certain margin below capacity. In some implementations, these and/or similar cache management operations may be performed by the manager 110.

In some implementations, the cache component 130 may include multiple caches 134a, 134b, etc. (collectively, "caches 134") (e.g., as shown in FIG. 1B, etc.). A first cache 134a may be a smaller, lower-latency cache that simply stores a key to a result stored in a second cache 134b. Upon receiving a problem 101, the controller 132 may search the first cache 134a to determine whether the second cache 134b includes a corresponding result 151. The controller 132 may receive a response from the first cache 134a very quickly (e.g., within one to several milliseconds). The controller 132 can send a preliminary response to the manager 110 indicating that a stored result 151 is incoming—this may allow the manager 110 to instruct the solver(s) 120 to cease processing, thereby conserving computing resources. The controller 132 may use the response received from the first cache 134a to retrieve the result 151 from the second cache 134b. The second cache 134b may be larger cache that includes the result 151 and any corresponding stored information (e.g., models/proofs, telemetry data, etc.). The controller 132 may return the result 151 and/or any of the additional information to the manager 110. Example operations of a tiered cache system are described below with reference to FIGS. 5 and 6.

FIG. 1B illustrates a cache component supporting multiple solver systems, according to embodiments of the present disclosure. In some implementations, a cache component 130 may support several solver systems 100a, 100b, etc. Although FIG. 1B shows two solver systems 100, a single cache component 130 may support many more solver systems 100. The systems 100 may include single-solver systems and/or portfolio-based solver systems. The cache component 130 may be configured to support operation of the systems 100 in parallel by, for example, handling problems 101 from both simultaneously, or queuing them in order of receipt and/or based on an agreed-to priority scheme.

The solver systems 100 may serve different requestors 105 or groups of requestors. As shown in FIG. 1B, a first system 100a may serve requestor(s) 105a while a second system 100b serves requestor(s) 105b. In some implementations, the cache component 130 may include policies and/or walls to prevent data leakage between systems 100 by, for example, controlling which cached results 151 may be shared with another system 100.

The first system 100a may include a first manager 110a and the second system 100b may include a second manager 110b. In various implementations, the systems 100a and 100b may include different solver(s) 120 or share the solver(s) 120. In some implementations, the managers 110a and 110b may write new results 151 to a shared queue for caching by the cache component 130. The controller 132 may then write the results 151 to the cache 134 efficiently using batch write operations.

In various implementations, the cache component 130 may operate in one or more of several possible configurations. In a first example configuration, a single cache component 130 may handle requests (e.g., to solve a problem 101) corresponding to a single requestor 105. For example, a requestor 105 may be associated with a requestor profile or account, which may correspond to a dedicated cache component 130. Another requestor profile/account may correspond to a different cache component 130. In a second example configuration, a single cache component 130 may support multiple requestors 105 and/or solver systems 100 (e.g., as shown in FIG. 1). In some cases, the cache component 130 may include features to enhance the security of data; for example, to prevent the first solver system 100a from probing the cache component 130 for data corresponding to the second solver system 100b (e.g., a so-called "side-channel attack"). Thus, in a third example configuration, the cache component 130 may include partitions such that a first partition corresponds to a first requestor 105a and/or system 100a and a second partition corresponds to a second requestor 105b and/or system 100b. In some cases, the cache component 130 may include separate indexes and/or caches corresponding to separate requestors 105 and/or systems 100. In various implementations, the system 100 may be configured to pool cached results globally, regionally, or for only a subset of a single user's queries. In the latter case, the system 100 may maintain a separate cache (or partitioned cache) for each desired isolation of results.

Figures 2, 3:
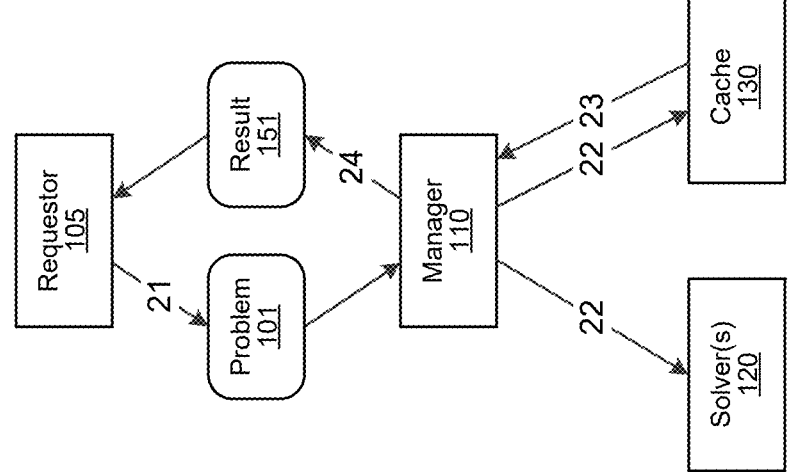
FIG. 2 illustrates example operations of the system when the cache includes a requested problem/result, according to embodiments of the present disclosure.
FIG. 3 illustrates example operations of the system updating the cache with a new problem/result, according to embodiments of the present disclosure.

FIG. 2 illustrates example operations of the system 100 when the cache includes a requested problem/result, according to embodiments of the present disclosure. At Step 21, a requestor 105 may send a problem 101 to the system 100. At Step 22, the manager 110 may receive the problem 101 and send it to one or more solvers 120 and the cache component 130. The cache component 130 may identify a stored result 151 corresponding to the problem and, at Step 23, return the stored result 151 to the manager 110. At Step 24, the manager 110 may return the result 151 to the requestor 105.

In some cases, the manager 110 may, upon receiving the result 151 from the cache component, instruct the solver(s) 120 to halt processing of the problem 101. In some cases, the manager 110 may verify the cached result 151 by allowing the solver(s) 120 to continue processing the problem 101, and comparing the solver's result 151 to the cached result 151. Example operations for verifying cached results 151 are described below with reference to FIG. 4.

FIG. 3 illustrates example operations of the system 100 updating the cache with a new problem/result, according to embodiments of the present disclosure. In the example operations of FIG. 3, the cache component 130 has either not responded to the manager 110 or responded with an indication that it does not have a stored response corresponding to the problem 101. The manager 110 may thus determine whether to store a result determined by a solver 120.

At Step 31, a requestor 105 may send a problem 101 to the system 100. At Step 32, the manager 110 may receive the problem 101 and send it to one or more solvers 120 and the cache component 130. At Step 33, a solver 120 may return a result 151 to the manager 110. At the time the manager 110 receives the result 151 from the solver 120, the manager 110 may have not yet received a response from the cache component 130 or may have received an indication that the cache component 130 does not have a stored response corresponding to the problem 101. At Step 34, the manager 110 may return the result 151 to the requestor 105.

In some implementations, the system 100 may, at Step 35, determine whether to store the result 151. The system 100 may determine whether or not to store the result depending on various factors and/or policies. For example, if a problem 101 was relatively easy to solve (e.g., requiring little time and/or compute to determine a result), caching the result 151 may yield little benefit. Similarly, if the result 151 is relatively large, it may be cheaper to process the problem 101 repeatedly rather than to cache the result 151. Caching policies may specify thresholds or other conditions regarding size, time, and/or compute for storing a particular problem 101 and/or result 151. Policies may be specified by the requestor 105 and/or by the system 100 itself (e.g., by an administrator). The policies may be determined based on relative cost of compute, cost of cache storage, and/or latency requirements. For example, in a use case that prioritizes low latency, a policy may allow for storing larger results 151. In a use case where latency is less of a priority, policies specifying minimum compute for a problem 101 versus maximum size for a result 151 may be optimized for cost.

In some implementations, the manager 110 may verify the result 151 prior to storing it. The manager 110 may do so by, for example, testing a model or proof for the result 151, or by allowing another solver 120 to determine a result 151 independently. Example operations for verifying a result 151 are described below with reference to FIG. 4.

If the system 100 determines not to store the result 151 ("No" at Step 35), the system 100 may simply discard the result 151 after returning it to the requestor 105. If the system 100 determines that the result 151 is to be cached ("Yes" at Step 35), the manager 110 may, at Step 36, send the result to the cache component 130. The cache component 130 may store the result 151 as, for example, a value of a key-value pair in a key-value store. The manager 110 and/or the cache component 130 may determine a key of the key-value pair using the problem 101 and/or a representation thereof. For example, the problem 101 itself may be the key and the result 151 may be the value; thus, the cache component 130 may be able to search the cache using a subsequently received problem 101 and, if the subsequently received problem 101 matches an existing key in the cache, the cache component 130 may retrieve the corresponding value, which may represent a stored result 151 corresponding to the subsequently received problem 101. In another example, the cache component 130 may calculate a hash of the problem 101 and use the resulting vector or string as the key; thus, when the cache component 130 may be able to search the cache using a subsequently received problem 101 by applying the hash function to the subsequently received problem 101 to determine the key. In some implementations, the manager 110 may send additional data to the cache component 130 for storage. The additional data may include a model and/or proof for verifying the result 151, an indication that the result 151 was verified with a model and/or proof, telemetry data corresponding to the result 151, etc. The steps of determining to store and storing (e.g., steps 35 and 36) may occur partially in parallel with returning a result (e.g., step 34) or may occur after returning the result, for example when the system 100 is operating a period of reduced traffic, off hours, or the like. Due to the architecture of the system 100, even if the system 100 receives the same problem 101 again prior to updating the cache component 130 with the new result 151, the system 100 will not return an error. Rather, the solver(s) 120 may respond as usual. If the cache component 130 receives two updates corresponding to the same result 151, the cache component 130 can determine (e.g., using the hash of the problem 101 that the cache component 130 already includes a stored result 151.

Figure 4:
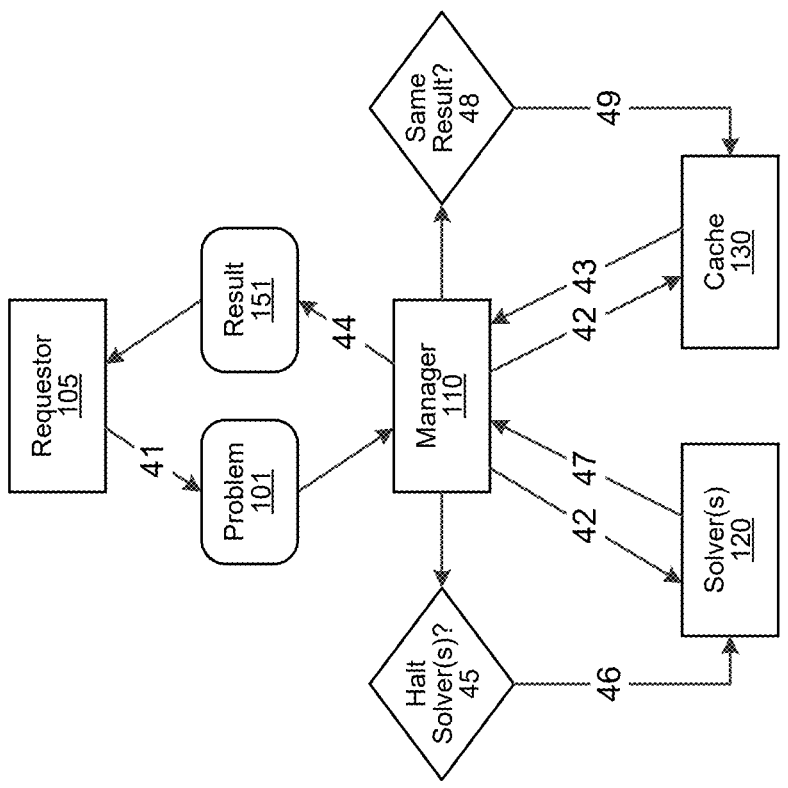
FIG. 4 illustrates example operations of the system using a solver to verify a cached problem/result, according to embodiments of the present disclosure.

FIG. 4 illustrates example operations of the system 100 using a solver to verify a cached problem/result, according to embodiments of the present disclosure. The operations may also be used to verify a result 151 determined by a solver 120 prior to storing in the cache as a new or updated result 151.

At Step 41, a requestor 105 may send a problem 101 to the system 100. At Step 42, the manager 110 may receive the problem 101 and send it to one or more solvers 120 and the cache component 130. The cache component 130 may identify a stored result 151 corresponding to the problem and, at Step 43, return the stored result 151 to the manager 110. At Step 44, the manager 110 may return the result 151 to the requestor 105.

At Step 45, the manager 110 may determine whether to halt the solver(s) 120. If so ("Yes" at Step 45), the manager 110 may, at Step 46, send an instruction to the solver(s) 120 to halt processing of the problem 101. If not, ("No" at Step 45), the manager 110 may allow the solver(s) 120 to continue processing the problem 101 so that the system 100 may verify the cached result 151. Accordingly, the manager 110 may await a result 151 from the solver(s) 120. In some implementations, the manager 110 may wait until an allotted amount of time lapses (e.g., an amount of time consistent with audit operation of the portfolio system).

At Step 47, a solver 120 may return a result 151 to the manager. At Step 48, the manager 110 may determine whether the cached result 151 is consistent with the solver's result 151. If so, ("Yes" at Step 48), the manager 110 may take no further action, as the cached result 151 is accurate. If not, ("No" at Step 48), the manager 110 may, at Step 49, replace the cached result with the solver's result 151. The manager 110 may take additional remedial steps; for example, notifying the requestor 105 that the result 151 previously sent is suspect and/or issuing a notification that further investigation of the offending solver 120 is warranted (e.g., by an administrator, engineer, scientist, etc.). In some cases, the manager 110 may take the offending solver 120 "offline" (e.g., suspend sending problems 101 to that solver) until the issue is diagnosed and addressed. In some implementations, the manager 110 may verify the solver's result 151 prior to replacing the cached result. The manager 110 may do so by, for example, testing a model and/or proof for the result 151, or by allowing another solver 120 to determine a result independently.

Figure 5:
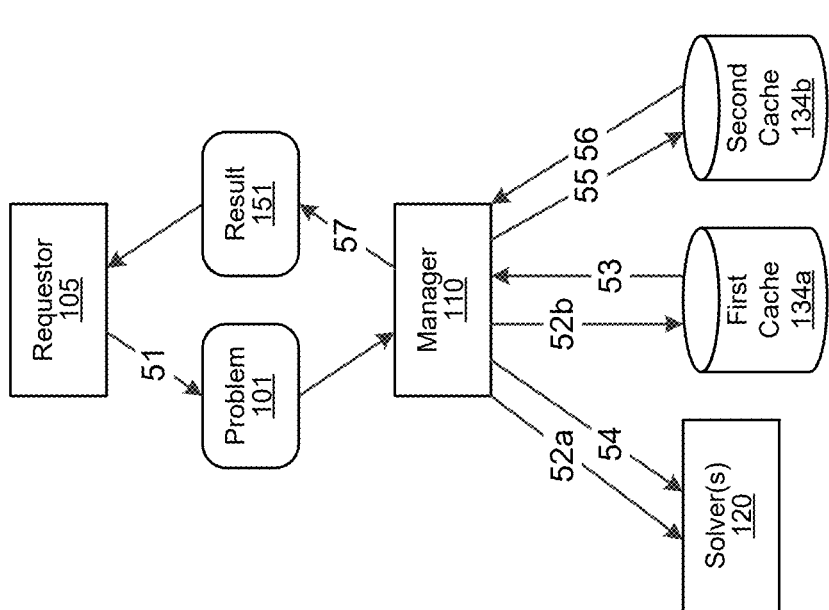
FIG. 5 is a conceptual diagram of the system implementing tiered caching, according to embodiments of the present disclosure.
Figures 6, 7:
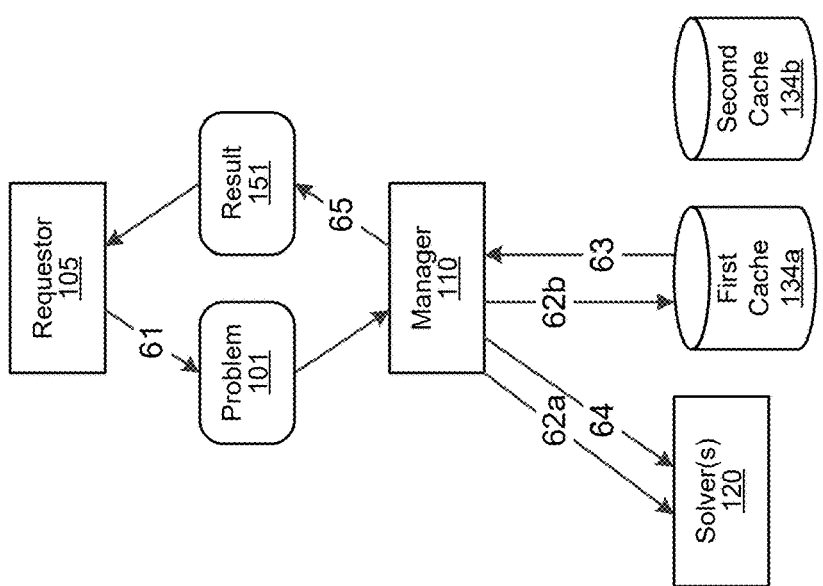
FIG. 6 illustrates example operations of the tiered-cache system when the first cache indicates that the system does not have the problem/result stored, according to embodiments of the present disclosure.
FIG. 7 is a block diagram conceptually illustrating an example component of the system, according to embodiments of the present disclosure.

FIGS. 5 and 6 are conceptual diagrams of the system 100 implementing tiered caching, according to embodiments of the present disclosure. As shown in FIG. 1A, the cache component 130 may include a first cache 134a and a second cache 134b, with a controller 132 configured to perform read/write operations to each. To simplify FIGS. 5 and 6, the operations are shown with respect to the caches 134 directly. FIG. 5 illustrates example operations in a case when the system 100 has a stored result 151 corresponding to the received problem 101, while FIG. 6 illustrates example operations in a case when the system 100 does not have a stored result 151.

As shown in FIG. 5, at Step 51, a requestor 105 may send a problem 101 to the system 100. At Step 52a, the manager 110 may send the problem 101 to one or more solvers 120. At Step 52b, the manager 110 may send the problem 101 to the cache component 130. In various implementations, the manager 110 may send the problem 101 to the one or more solvers 120 and the cache component 130 (e.g., perform Steps 52a and 52b) simultaneously and/or slightly staggered, as described previously. In either case, the cache component 130 and calls thereto remain out of the critical path for sending the problem 101 to the one or more solvers 101. The cache component 130 may check the first cache 134a and identify a stored result 151 corresponding to the problem 101. At Step 53, the cache component 130 may return an indication to the manager 110 that the cache component 130 has identified the stored result 151.

Having received the indication, the manager 110 may, at Step 54, send an indication to the solver(s) 120 to halt processing with respect to the problem 101 to conserve computing resources. At Step 55, the manager 110 (and/or the controller 132) may use the indication received at Step 53 to retrieve the stored result 151 from the second cache 134b. At Step 56, the cache component 130 may return the stored result 151 to the manager 110. At Step 57, the manager 110 may return the result 151 to the requestor 105.

The operations shown in FIG. 5 may be combined with the operations shown in FIGS. 2 through 4. For example, in addition to the particular steps shown in FIG. 5, the system 100 may also verify results 151 as shown in FIG. 4.

FIG. 6 illustrates example operations of the tiered-cache system 100 when the first cache 134a indicates that the system does not have the problem/result stored, according to embodiments of the present disclosure. Similar to the operations shown in FIG. 5, the operations may begin with Step 61, with a requestor 105 sending a problem 101 to the system 100. At Step 62a, the manager 110 may send the problem 101 to one or more solvers 120. At Step 62b, the manager 110 may send the problem 101 to the cache component 130. In various implementations, the manager 110 may send the problem 101 to the one or more solvers 120 and the cache component 130 (e.g., perform Steps 62a and 62b) simultaneously and/or slightly staggered, as described previously. In either case, the cache component 130 and calls thereto remain out of the critical path for sending the problem 101 to the one or more solvers 101. The cache component 130 may check the first cache 134a and determine that it has no stored result 151 corresponding to the problem 101. Thus, at Step 63, the cache component 130 may return an indication to the manager 110 that the cache component 130 has no stored result 151. In some implementations, however, the cache component 130 may simply not respond. At Step 64, a solver 120 may respond with a result 151, which the manager 110 may, at Step 65, return to the requestor 105.

The operations shown in FIG. 6 may be combined with the operations shown in FIGS. 2 through 4. For example, in addition to the particular steps shown in FIG. 5, the system 100 may also store the solver's result 151 as shown in FIG. 3 (e.g., in the second cache 134b), and update the first cache 134a accordingly.

The various operations described with respect to FIGS. 2 through 6 may, in some implementations, include more, fewer, and/or different steps than those described. Some steps may be duplicated and/or divided into sub steps. Certain steps may be performed in parallel and/or in a different order that what is shown in the drawings. Some operations may be performed online—for example, within tens or hundreds of milliseconds of the system 100 receiving a problem 101—while some operations may be performed offline; for example, as batch operations performed once a day during non-peak hours.

FIG. 7 is a block diagram conceptually illustrating an example system component 700 that may be used to implement some or all of the components of the portfolio-based solver system 100, according to embodiments of the present disclosure. The system component(s) 700 may operate as part of a cloud computing architecture. The system component(s) 700 may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple system components 700 may be included in the overall system 100 of the present disclosure. In operation, each of these systems may include computer-readable and computer-executable instructions that reside on the respective system component 700, as will be discussed further below.

The system component(s) 700 may include one or more controllers/processors 704, which may each include a central processing unit (CPU) for processing data and computer-readable instructions, and a memory 706 for storing data and instructions of the respective device. The memories 706 may individually include volatile random-access memory (RAM), non-volatile read only memory (ROM), non-volatile magnetoresistive memory (MRAM), and/or other types of memory. A system component 700 may also include a data storage component 708 for storing data and controller/processor-executable instructions. Each data storage component 708 may individually include one or more non-volatile storage types such as magnetic storage, optical storage, solid-state storage, etc. A system component 700 may also be connected to removable or external non-volatile memory and/or storage (such as a removable memory card, memory key drive, networked storage, etc.) through respective input/output device interfaces 702.

Computer instructions for operating a system component 700 and its various components may be executed by the respective device's controller(s)/processor(s) 704, using the memory 706 as temporary "working" storage at runtime. A system component's 700 computer instructions may be stored in a non-transitory manner in non-volatile memory 706, data storage component 708, or an external device(s). Alternatively, some or all of the executable instructions may be embedded in hardware or firmware on the respective device in addition to or instead of software.

A system component 700 includes input/output device interfaces 702. A variety of components may be connected through the input/output device interfaces 702. Additionally, A system component 700 may include an address/data bus 724 for conveying data among components of the respective device. Each component within a system component 700 may also be directly connected to other components in addition to (or instead of) being connected to other components across the bus 724.

The system component 700 may connect to one or more networks 199 via the input/output device interfaces 702 using, for example, a wireless local area network (WLAN) (such as Wi-Fi) radio, Bluetooth, and/or wireless network radio, such as a radio capable of communication with a wireless communication network such as a Long-Term Evolution (LTE) network, WiMAX network, 3G network, 4G network, 5G network, 6G network, etc. A wired connection such as Ethernet may also be supported. Through the network(s) 199, the system 100 may be distributed across a networked environment. The I/O device interface 702 may also include communication components that allow data to be exchanged between devices such as different physical servers in a collection of servers or other components.

As noted above, multiple system components 700 may be employed in a single system 100. In such a multi-component system, each of the component may include different components for performing different aspects of the system's processing. In some cases, the multiple components may overlap. The components of the system component(s) 700, as described herein, are illustrative, and may be located as a stand-alone device or may be included, in whole or in part, as a component of a larger device or system. As can be appreciated, a number of components may exist either as a system component(s) and/or on user device. Unless expressly noted otherwise, the system version of such components may operate similarly to the user device version of such components and thus the description of one version (e.g., the system version or the local user device version) applies to the description of the other version (e.g., the local user device version or system version) and vice-versa.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving, by a manager component from a system component, first data representing a first satisfiability problem;
   determining second data representing a request to determine whether the first satisfiability problem is satisfiable or unsatisfiable;
   sending the second data to a first cache component, the first cache component storing results data related to previously solved satisfiability problems;
   prior to receiving a response to the second data from the first cache component, sending the second data to at least a first solver component configured to determine whether a logical expression is satisfiable or unsatisfiable, the first solver component and the first cache component processing the second data at least partially in parallel;
   identifying, by the first cache component, a stored first result corresponding to the first satisfiability problem;
   receiving, by the manager component, the stored first result; and
   prior to receiving a response to the second data from the first solver component, sending a first indication of the first result to the system component.

2. The computer-implemented method of claim 1, further comprising:
   receiving third data representing a second satisfiability problem;
   determining fourth data representing a request to determine whether the second satisfiability problem is satisfiable or unsatisfiable;
   sending the fourth data to the first cache component;
   prior to receiving a response to the fourth data from the first cache component, sending the fourth data to at least the first solver component;
   receiving, by the manager component from the first solver component in response to the fourth data, a second result corresponding to the second satisfiability problem;
   sending, in response to the third data, a second indication of the second result;
   determining, using the third data, a first key for storing the second result;
   determining, using the fourth data, a first value corresponding to the second result; and
   storing, by the first cache component, a first key-value pair corresponding to the first key and the first value.

3. A computer-implemented method comprising:
   receiving, by a manager component from a system component, first data representing a first satisfiability problem;

sending the first data to a first cache component, the first cache component storing results data related to previously solved satisfiability problems;
   prior to receiving a response to the first data from the first cache component, sending the first data to at least a first solver component configured to determine whether a logical expression is satisfiable or unsatisfiable;
   receiving, by the manager component from the first cache component, a stored first result corresponding to the first data; and
   prior to receiving a response to the first data from the first solver component, sending a first indication of the first result to the system component.

4. The computer-implemented method of claim 3, further comprising:
   receiving second data representing a second satisfiability problem;
   sending the second data to the first cache component;
   prior to receiving a response to the second data from the first cache component, sending the second data to at least the first solver component;
   receiving, by the manager component from the first solver component in response to the second data, a second result corresponding to the second satisfiability problem; sending, in response to the second data, a second indication of the second result; and
   sending the second result to the first cache component.

5. The computer-implemented method of claim 3, further comprising:
   prior to receiving the first data, determining that a storage size corresponding to the first result is smaller than a threshold size; and
   in response to determining that the storage size is smaller than the threshold size, storing the first result in the first cache component.

6. The computer-implemented method of claim 3, further comprising:
   prior to receiving the first data, determining that an amount of computing resources used to generate the first result exceeds a threshold amount; and
   in response to determining that the amount of computing resources is smaller than the threshold amount, storing the first result in the first cache component.

7. The computer-implemented method of claim 3, further comprising:
   prior to receiving the first data, determining model data that verifies the first result; and
   storing the model data in the first cache component.

8. The computer-implemented method of claim 3, further comprising:
   sending, by the first cache component to the manager component in response to identifying the stored first result, a second indication of the stored first result;
   in response to receiving the second indication, sending a request for the stored first result to a second cache component; and
   sending, by the second cache component to the manager component in response to the request, the stored first result.

9. The computer-implemented method of claim 8, further comprising:
   in response to receiving the second indication and before receiving the stored first result, sending a third indication to the first solver component to halt processing of the first data.

10. The computer-implemented method of claim 3, further comprising:

receiving second data representing a second satisfiability problem;

sending the second data to the first cache component;

sending the second data to the first solver component;

receiving, from the first cache component, a stored second result corresponding to the second satisfiability problem;

receiving, from the first solver component, a third result corresponding to the second satisfiability problem;

comparing the stored second result and the third result; and based on comparing the stored second result and the third result, sending the third result to the first cache component.

11. The computer-implemented method of claim 3, further comprising:

receiving second data representing a second satisfiability problem;

determining an allotted time for processing the second data;

sending the second data to the first cache component;

sending the second data to the first solver component;

sending the second data to a second solver component;

receiving, from the first solver component, a second result corresponding to the second satisfiability problem;

receiving, from the first solver component, third data representing a proof of the second result; and in response to receiving the third data and prior to the allotted time elapsing:

sending, to the second solver component, a third indication to halt processing of the second data, and sending, in response to the second data, a second indication of the second result.

12. A computing system, comprising:

at least one processor; and at least one memory comprising instructions that, when executed by the at least one processor, cause the computing system to:

receive, by a manager component from a system component, first data representing a first satisfiability problem;

send the first data to a first cache component, the first cache component storing results data related to previously solved satisfiability problems;

prior to receiving a response to the first data from the first cache component, send the first data to at least a first solver component configured to determine whether a logical expression is satisfiable or unsatisfiable;

receive, by the manager component from the first cache component, a stored first result corresponding to the first data; and prior to receiving a response to the first data from the first solver component, send a first indication of the first result to the system component.

13. The computing system of claim 12, wherein the at least one memory further comprises instructions that, when executed by the at least one processor, further cause the computing system to:

receive second data representing a second satisfiability problem;

send the second data to the first cache component;

prior to receiving a response to the second data from the first cache component, sending the second data to at least the first solver component;

receive, by the manager component from the first solver component in response to the second data, a second result corresponding to the second satisfiability problem; sending, in response to the second data, a second indication of the second result; and send the second result to the first cache component.

14. The computing system of claim 12, wherein the at least one memory further comprises instructions that, when executed by the at least one processor, further cause the computing system to:

prior to receiving the first data, determine that a storage size corresponding to the first result is smaller than a threshold size; and in response to determining that the storage size is smaller than the threshold size, store the first result in the first cache component.

15. The computing system of claim 12, wherein the at least one memory further comprises instructions that, when executed by the at least one processor, further cause the computing system to:

prior to receiving the first data, determine that an amount of computing resources used to generate the first result exceeds a threshold amount; and in response to determining that the amount of computing resources is smaller than the threshold amount, store the first result in the first cache component.

16. The computing system of claim 12, wherein the at least one memory further comprises instructions that, when executed by the at least one processor, further cause the computing system to:

prior to receiving the first data, determine model data that verifies the first result; and store the model data in the first cache component.

17. The computing system of claim 12, wherein the at least one memory further comprises instructions that, when executed by the at least one processor, further cause the computing system to:

send, by the first cache component to the manager component in response to identifying the stored first result, a second indication of the stored first result;

in response to receiving the second indication, send a request for the stored first result to a second cache component; and send, by the second cache component to the manager component in response to the request, the stored first result.

18. The computing system of claim 17, wherein the at least one memory further comprises instructions that, when executed by the at least one processor, further cause the computing system to:

in response to receiving the second indication and before receiving the stored first result, send a third indication to the first solver component to halt processing of the first data.

19. The computing system of claim 12, wherein the at least one memory further comprises instructions that, when executed by the at least one processor, further cause the computing system to:

receive second data representing a second satisfiability problem;

send the second data to the first cache component;

send the second data to the first solver component;

receive, from the first cache component, a stored second result corresponding to the second satisfiability problem;

receive, from the first solver component, a third result corresponding to the second satisfiability problem;

compare the stored second result and the third result; and based on comparing the stored second result and the third result, send the third result to the first cache component.

20. The computing system of claim 12, wherein the at least one memory further comprises instructions that, when executed by the at least one processor, further cause the computing system to:

receive second data representing a second satisfiability problem;

determine an allotted time for processing the second data;

send the second data to the first cache component;

send the second data to the first solver component;

send the second data to a second solver component;

receive, from the first solver component, a second result corresponding to the second satisfiability problem;

receive, from the first solver component, third data representing a proof of the second result; and in response to receiving the third data and prior to the allotted time elapsing:

send, to the second solver component, a third indication to halt processing of the second data, and send, in response to the second data, a second indication of the second result.

\* \* \* \* \*